United States Patent [19]

Brown et al.

[11] Patent Number: 4,889,753

[45] Date of Patent: Dec. 26, 1989

[54] PRESSURE SENSITIVE ADHESIVE RELEASE LINER AND FLUOROSILICONE COMPOUNDS, COMPOSITIONS AND METHOD THEREFOR

[75] Inventors: Paul L. Brown, Saginaw; David L. Stickles, Midland, both of Mich.

[73] Assignee: Dow Corning Corporation, Midland, Mich.

[21] Appl. No.: 322,141

[22] Filed: Mar. 13, 1989

Related U.S. Application Data

[62] Division of Ser. No. 135,905, Dec. 21, 1987, Pat. No. 4,842,902, which is a division of Ser. No. 870,567, Jun. 4, 1986, Pat. No. 4,736,048.

[51] Int. Cl.$^4$ .............................................. B32B 7/06
[52] U.S. Cl. ...................................... 428/40; 428/447
[58] Field of Search .................................. 428/40, 447

[56] References Cited

U.S. PATENT DOCUMENTS

| | | |
|---|---|---|
| 3,050,411 | 8/1962 | Keil . |
| 4,039,707 | 8/1977 | O'Malley ............................. 428/40 |
| 4,039,707 | 8/1977 | O'Malley . |
| 4,472,480 | 9/1984 | Olson . |
| 4,565,714 | 1/1986 | Koshar . |
| 4,736,048 | 4/1988 | Brown et al. ........................ 528/14 |
| 4,842,902 | 6/1989 | Brown et al. ....................... 427/387 |

*Primary Examiner*—Alexander S. Thomas
*Attorney, Agent, or Firm*—George A. Grindahl

[57] ABSTRACT

Pressure sensitive adhesives can be protected with a releasable liner having a cured fluoroalkyl silicone coating which contains as little as two percent fluoroalkyl-substituted siloxane units. In a preferred embodiment of this invention silicone pressure sensitive adhesives can be solvent-cast, and even cured, directly onto the release surface of the liner and can be removed from the protective liner with a force of not more than 400 grams per inch. The fluoroalkyl silicone copolymers of this invention are prepared by a process which involves the preparation of a cohydrolyzate of fluoroalkyl-containing and fluoroalkyl-free siloxane units, followed by further polymerization of the cohydrolyzate with other siloxane units.

11 Claims, No Drawings

PRESSURE SENSITIVE ADHESIVE RELEASE LINER AND FLUOROSILICONE COMPOUNDS, COMPOSITIONS AND METHOD THEREFOR

This is a divisional of co-pending application Ser. No. 07/135,905 filed on Dec. 21, 1987 now U.S. Pat. No. 4,842,902 which was a divisional of co-pending application Ser. No. 06/870,567, now U.S. Pat. No. 4,736,048, filed on June 4, 1986.

BACKGROUND OF THE INVENTION

The present invention relates generally to the release of pressure sensitive adhesives, such as organic pressure sensitive adhesives and silicone pressure sensitive adhesives, herein also called PSAs, OPSAs and SPSAs, respectively. In a particular aspect, this invention relates to a method for coating a substrate to provide a release backing which can be used to protect SPSAs, to curable coating compositions therefor and to articles of manufacture comprising the cured coatings.

SPSAs, such as those disclosed in U.S. Pat. Nos. 2,736,721; 2,814,601; 2,857,356; 3,528,940 3,929,704; 3,983,298; 4,309,520; Canadian Patent No. 711,756 and British Patent No. 998,232 are well known for their excellent thermal stability and tenacious adhesiveness. While these properties have valuable utility the adhesiveness, i.e. tack and/or adhesive strength, of SPSAs is also a significant problem.

Whether the SPSA has the form of, for example, an adhesive layer on substrate in the form of a roll of tape; an adhesive layer on an article protected with a peelable backing, such as a decorative trim item to be adhered to an automobile or a medical item to be adhered to the skin of a person; or a transfer adhesive layer protected on two surfaces by peelable backings, the SPSA must be separated from an adjacent surface before it can be used for its intended purpose.

Because of the above-noted and well-known tenacious adhesiveness of SPSAs substantially every material that has been used as a protective backing or as a tape substrate for SPSAs has been given some sort of surface treatment to facilitate the removing of the adjacent surface from the adhesive without adhesive separation or transfer and with a force sufficiently small to avoid the tearing of the substrate, item or backing.

Keil, U.S. Pat. No. 3,050,411, employed a dispersion of a mixture of a methylhydrogenpolysiloxane, certain fluoroalkyl-substituted siloxanes and a curing catalyst as a surface release agent. The siloxanes had a viscosity of at least 5000 centistokes at 25° C and consisted of at least 90 mol % of fluorinated siloxane units having the formula $RCH_2CH_2Si(CH_3)O$, wherein R is a perfluoroalkyl group having less than 4 carbon atoms, not more than 10 mol % of siloxane units having the formula $R'_nSiO_{(4-n)/2}$, a degree of substitution ranging from 1.9 to 2.0 and at least two silicon-bonded hydroxyl or lower alkoxyl radicals. Keil's compositions were found to release SPSA tapes with ease and without loss of the adhesiveness of the SPSA; however, said compositions wherein R is $CF_3$ do not provide easy release of SPSAs which have been cast thereon from a solvent solution of the adhesive. In addition, said compositions do not provide suitable release of curable SPSAs that have been cast and cured thereon. Compositions wherein R was $C_2F_5$ or a mixture of $CF_3$ and $C_3F_7$ were said to give similar results.

O'Malley, U.S. Pat. No. 4,039,707, noted that if the SPSA was of a certain type, i.e. a SPSA containing diphenylsiloxane units, the standard release coatings based on dimethylsiloxanes that were used with OPSAs were suitable for use therewith as a release composition. However, it is known that dimethylsilicone coatings will not release dimethylsiloxane-based SPSAs.

Olson, U.S. Pat. No. 4,472,480, proposed a release backing comprising an insoluble polymer film having a plurality of perfluoroalkylene oxide repeating units. When formed by in-situ polymerization of a monomer solution the polymer film was said to resist transfer to aggressively tacky PSAs and to be exceedingly thin. Among the polymerizable monomers illustrated by Olson were monomers bearing acrylate, epoxy, isocyanate and hydrolyzable silane groups. When epoxy-containing monomers were used epoxy-substituted silanes could be copolymerized therewith. When monomers bearing hydrolyzable silane groups were used "silanes which may be linear or cyclic" were said to be copolymerizable therewith.

Koshar, European Patent Application No. 165,059, dated Dec. 18, 1985, discloses a low energy release liner for SPSAs comprising the hydrosilylation reaction product of an ethylenically unsaturated perfluoropolyether and a compound bearing silicon-bonded hydrogen atoms.

It is apparent from the above that the preparation of a completely acceptable release backing for SPSAs is a long-lived problem that continues to command research and development resources.

One reason for the continuing research and development on release coatings for SPSAs is that the preferred process for preparing an article containing a PSA and a release backing, which process comprises casting a solution of the PSA onto the release backing and then bonding the article to the adhesive layer, aggravates the subsequent release of a SPSA from the release backing to the extent that an unacceptably high release force is needed to separate the release backing from the adhesive and/or the SPSA has an unacceptably low adhesive force after it has been separated from the release backing.

The use of this casting practice, instead of applying the release backing to an adhesive layer already formed on the article, is necessary, for example, in the process of forming an adhesive transfer tape. In this process the PSA is cast onto one release backing and a second release backing is thereafter applied to the adhesive layer. Although it is necessary that the adhesive release from one of the release backings more easily than from the other release backing, the greater release force must not be so great as to result in cohesive failure of the adhesive or tearing of the release backing.

The use of this casting practice is also necessary, for example, when an article to which a heat-curable PSA is bonded is sensitive to the temperatures used in the curing process. In this case the PSA is cast onto the release backing and heat-cured and then the heat-sensitive article is bonded to the adhesive layer.

Until the present invention there had been no release coating compositions that would release solvent-cast, curable SPSAs with acceptable release force and without substantially altering the adhesiveness of the released SPSA.

Another reason for the continuing research and development on release coatings for SPSAs is the progress in the formulation of SPSAs. For example, curable SPSAs having an adhesive strength substantially exceeding 1,200 grams/inch, as measured by standard methods hereinafter described, are now available. For another example, recently developed SPSAs that have resistance to amine-containing materials, such as medicines, present new release problems, even though they require release forces much less than 1,000 grams/inch. In this regard, reference is made to U.S. patent application Ser. Nos. 665,796; 665,797 and 665,805, filed on Oct. 29, 1984 an 780,505, filed on Aug. 26, 1985, said applications being assigned to the assignee of the present application.

An improved release backing for SPSAs, particularly solvent-cast SPSAs, and most importantly for solvent-cast, heat-curable SPSAs, is thus needed in the adhesives industry.

BRIEF SUMMARY OF THE INVENTION

It is an object of this invention to provide a method for preparing an improved peelable protective backing for PSAs. It is a particular object of this invention to provide a protective backing that can be used to receive, and subsequently release, a solvent-cast SPSA. It is also an object of this invention to provide a peelable protective backing that can be used with solvent-cast, heat-curable SPSAs. It is an additional object of this invention to provide a coating composition for preparing a surface that will release a PSA, particularly a solvent-cast SPSA. It is a further object of this invention to provide an improved article comprising a layer of SPSA which is protected by a peelable backing.

These objects, and others which will be apparent upon considering the following disclosure and appended claims, are obtained by the present invention which, briefly stated, comprises applying certain curable fluorosilicone compositions to a substrate and curing the applied composition before it is brought into contact with a PSA.

The curable fluorosilicone composition comprises a fluorosilicone polymer which will provide a durably adhered, fully cured coating having a low surface energy and a high degree of molecular chain flexibility.

This polymer is mixed with a curing agent and coated and cured onto a substrate for the purpose of releasing normally tacky adhesives subsequently adhered thereto. Certain forms thereof, suitably formulated, can be used to release solventcast, heat-cured SPSAs. In view of the teachings of the art it was surprising to discover that the introduction of as little as 2 mol percent of fluorinated siloxane units, in some instances, into a polydimethylsiloxane would change the polydimethylsiloxane from a SPSA-holding to a SPSA-releasing material, when cured.

Surprisingly, it has been found that the method and composition of this invention succeed where the methods and compositions of the prior art, including the more highly fluorinated silicone compositions of Keil, fail; i.e. in the release of solvent-cast SPSAs, and even solvent-cast, heat-cured SPSAs, with a usable release force and a minimum of adhesive alteration.

DETAILED DESCRIPTION OF THE INVENTION

In a first aspect the present invention relates to a coating composition comprising a curable mixture consisting essentially of (A) a fluorosilicone polymer containing an average of at least two silicon-bonded curing radicals per molecule selected from the group consisting of hydrogen, hydroxyl and alkenyl and at least 2 mol percent, based on the total number of siloxane units in the fluorosilicone polymer, of fluorinated siloxane units, any remaining siloxane units in the polymer being non-fluorinated siloxane units; said fluorinated siloxane units having the formula $(RQ)(R')_a(Z)_bSiO_{(3-a-b)/2}$ and said non-fluorinated siloxane units having the formula $(R')_c(Z)_dSiO_{(4-c-d)/2}$ where, in said fluorinated and non-fluorinated siloxane units, R denotes a perfluoroalkyl radical having from 4 to 8 carbon atoms and, additionally, 2 to 3 carbon atoms when the fluorosilicone polymer contains less than 90 mol percent fluorinated siloxane units and, additionally, 1 carbon atom when the fluorosilicone polymer contains from 7 to 10 mol percent fluorinated siloxane units, Q denotes a divalent hydrocarbon, hydrocarbon ether or hydrocarbon thioether radical linking the R radical to a silicon atom through at least 2 carbon atoms, R' denotes a silicon-bonded, monovalent hydrocarbon radical free of aliphatic unsaturation, Z denotes said silicon-bonded curing radical, $a=0$ to 2, $b=0$ to 2, $a+b=0$ to 2, $c=0$ to 3, $d=0$ to 3 and $c+d=0$ to 3 and, (B) an effective amount of a curing agent for the fluorosilicone polymer.

The fluorosilicone polymer (Component A) of the compositions of this invention is an organopolysiloxane consisting essentially of silicon-bonded curing radicals, fluorinated siloxane units and, optionally, non-fluorinated siloxane units.

The silicon-bonded curing radicals are selected from the group consisting of hydrogen atoms, hydroxyl radicals and alkenyl radicals, examples of the latter being vinyl, allyl, butenyl, pentenyl, hexenyl, octenyl and decenyl. Preferably the aliphatic unsaturation in the alkenyl curing radicals is in the terminal, i.e. omega position.

By fluorinated siloxane units it is meant siloxane polymer units that bear a perfluoroalkyl radical suitably bonded to a silicon atom. The fluorinated siloxane units have the formula $(RQ)(R')_a(Z)_bSiO_{(3-a-b)/2}$, general examples of which include chain-terminating siloxane units having the formula $(RQ)(R')_a(Z)_bSiO_{1/2}$, where the sum of $a+b$ is 2, such as $(RQ)(R')_2SiO_{1/2}$, $(RQ)(Z)_2SiO_{1/2}$ and $(RQ)(R')(Z)SiO_{1/2}$, chain-extending siloxane units having the formulae $(RQ)(R')SiO_{2/2}$ and $(RQ)(Z)SiO_{2/2}$ and chain-branching siloxane units having the formula $(RQ)SiO_{3/2}$.

The non-fluorinated siloxane units, if present, have the formula $(R')_c(Z)_dSiO_{(4-c-d)/2}$, general examples of which include chain-terminating siloxane units having the formula $(R')_c(Z)_dSiO_{1/2}$ where the sum of $c+d$ is 3, such as $(R')_3SiO_{1/2}$, $(R')_2(Z)SiO_{1/2}$, $(R')(Z)_2SiO_{1/2}$ and $(Z)_3SiO_{1/2}$, chain-extending siloxane units having the above formula where the sum of $c+d$ is 2, such as $(R')_2SiO_{2/2}$, $(R')(Z)SiO_{2/2}$ and $(Z)_2SiO_{2/2}$ and chain-branching siloxane units having the above formula where the sum of $c+d$ is 1 or 0, such as $(R')SiO_{3/2}$, $(Z)SiO_{3/2}$ and $SiO_{4/2}$.

Although the fluorosilicone polymer can have any viscosity up to several million centistokes, it is believed necessary that the polymer not be a non-fluid, such as a gel or a solid. Therefore, said chain-branching siloxane units, if present, should be present in only minor amounts.

It is preferred that the fluorosilicone polymer be made up of only chain-extending and chain-terminating siloxane units selected from the group consisting of $YMe_2SiO_{1/2}$, $RQMeYSiO_{1/2}$, $MeYSiO_{2/2}$ and $RQYSiO_{2/2}$ siloxane units; wherein Y denotes Me or A, A denotes an omega-alkenyl radical and Me denotes the methyl radical. The presence of other chain-terminating and/or chain-extending siloxane units would lead to polymers that contain silicon atoms that bear a plurality of curing radicals, and would be expected to present synthesis, as well as curing, problems.

Specific examples of said selected siloxane units include, but are not limited to, $Me_3SiO_{1/2}$, $Me_2ViSiO_{1/2}$, $RQMe_2SiO_{1/2}$, $RQMeViSiO_{1/2}$, $Me_2SiO_{2/2}$, $MeViSiO_{2/2}$, $RQMeSiO_{2/2}$ and $RQViSiO_{2/2}$, where R is, for example, perfluorobutyl.

General examples of preferred fluorosilicone polymers include, but are not limited to, the following:
$YMe_2SiO(MeYSiO)_m(RQYSiO)_nSiMe_2Y$,
$RQMeYSiO(MeYSiO)_m(RQYSiO)_nSiMeYRQ$,
$Me_3SiO(Me_2SiO)_{0.95m}(MeViSiO)_{0.05m}(RQMeSiO)_n$-$SiMe_3$,
$ViMe_2SiO(Me_2SiO)_m(RQMeSiO)_nSiMe_2Vi$,
$ViMeRQSiO(RQMeSiO)_nSiMeRQVi$,
$Me_2RQSiO(RQMeSiO)_{0.95n}(RQViSiO)_{0.05n}$ and
$Me_3SiO(Me_2SiO)_m(RQMeSiO)_{0.90n}(RQViSiO)_{0.10n}SiMe_3$,
wherein the viscosity of the polymer ranges from that of a freely flowing liquid to a slowly flowing gum and m and n have values of from zero to 10,000 and more.

For the purpose of providing a fully cured coating on a substrate which will release SPSA, solvent-cast thereon, with a force of no more than 200 grams per inch, it is preferred that the fluorosilicone polymer have a linear structure and in-the-chain curing radicals as represented by the formula $YMe_2SiO(Me_2SiO)_x[RCH_2CH_2Si(Me)O]_y(MeASiO)_zSiMe_2Y$ wherein the values of x, y and z are each greater than zero and are such that the fluorosilicone polymer contains from 1 to 10 mol percent alkenyl-containing siloxane units, at least 5 mol percent fluorinated siloxane units and the balance dimethylsiloxane units.

For the purpose of providing a fully cured coating which will release solvent-cast, heat-curable SPSAs with a force of no more than 200 grams per inch it is preferred that the fluorosilicone polymer have a linear structure and in-the-chain curing radicals as represented by the formula noted immediately above wherein the values of x, y and z are each greater than zero and are such that the fluorosilicone polymer contains from 3 to 7 mol percent alkenyl-containing siloxane units, from 20 to 50 mol percent fluorinated siloxane units and the balance dimethylsiloxane units, and has a viscosity of from 100 to 1000 centistokes at 25° C.

In addition to limiting the fluorosilicone polymer to such a structure it may also be necessary to limit the type and amount of curing agent that is used in the curable composition, as delineated below.

The terminal Y radicals can be methyl or alkenyl, such as vinyl, without significantly altering the release properties of a release backing of this invention. However, it may be desirable that the terminal Y radicals be alkenyl under moderate curing conditions, such as low curing temperatures, short curing times or attenuated curing catalyst activity.

In the above formulae for the fluorosilicone polymer and its siloxane units R denotes a perfluoroalkyl radical having from 4 to 8 carbon atoms, over the complete range of from 2 to 100 mol % fluorinated siloxane units. It has been discovered that these compositions provide unexpected release of solvent-cast SPSAs, in view of what the art teaches. Moreover, R additionally denotes a perfluoroalkyl radical having from 2 to 3 carbon atoms over the complete range of 2 to less than 90 mol % fluorinated siloxane units since these compositions also provide unexpectedly low release of solvent-cast SPSAs. Additionally, when the fluorinated siloxane units are used in limited amounts of 7 to 10 mol percent, R additionally denotes a perfluoroalkyl radical having 1 carbon atom. The R radicals can be identical or different and can have a normal or a branched structure. Examples thereof include $CF_3$-, $C_2F_5$-, $C_3F_7$-, $C_4F_9$-, such as $CF_3CF_2CF_2CF_2$-, $(CF_3)_2CFCF_2$-, $(CF_3)_3C$- and $CF_3CF_2(CF_3)CF$-; $C_5F_{11}$-, such as $CF_3CF_2CF_2CF_2CF_2$-; $C_6F_{13}$-, such as $CF_3(CF_2)_4CF_2$-; $C_7F_{14}$-, such as $CF_3(CF_2CF_2)_3$-; and $C_8F_{17}$-.

Although this invention has not been investigated with polymers containing perfluoroalkyl radicals larger than perfluorooctyl it is reasonable, and within the scope and spirit of the present invention, that R can be $C_9F_{19}$-, $C_{10}F_{21}$-, and larger. However, it is clear that polymers containing perfluoroalkyl radicals containing 1 to 8 carbon atoms, depending upon the amount of fluorinated siloxane units in the fluorosilicone polymer, provide excellent results and that the use of larger perfluoroalkyl radicals would only provide incremental improvements at higher cost.

Each perfluoroalkyl radical is bonded to a silicon atom by way of Q, a divalent spacing radical containing carbon, hydrogen and, optionally, oxygen and/or sulfur atoms which are present as ether and thioether linkages, respectively. The sulfur and oxygen atoms, if present, must be bonded to only carbon atoms.

Each Q radical can have any structure containing the elements listed; however, each is preferably an alkylene radical having a normal or branched structure. Examples of suitable alkylene radicals include -$CH_2CH_2$-, -$CH_2CH_2CH_2$-, -$CH_2(CH_3)CH_2$-, -$(CH_2CH_2)_2$-, -$CH_2(CH_3)CH_2CH_2$- and -$CH(CH_3)CH_2$-.

Each fluorinated radical, RQ, preferably has the formula $RCH_2CH_2$-. Advantageously, the R radicals need be no larger than the $CF_3CF_2CF_2CF_2$- radical in order to have a fluorosilicone polymer that provides the desirable release of SPSAs when cured. Accordingly, the fluorosilicone polymers that are to be used in the curable compositions of this invention preferably contain fluorinated siloxane units delineated above whose RQ radicals have the structure $CF_3CF_2CF_2CF_2Q$-, and most preferably $CF_3CF_2CF_2CF_2CH_2CH_2$-.

In the above formulae for the fluorosilicone polymer and its siloxane units R' denotes a silicon-bonded monovalent hydrocarbon radical, preferably having from 1 to 6 carbon atoms, and containing no aliphatic unsaturation. The R' radicals can be identical or different, as desired. Examples of suitable R' radicals include alkyl radicals, such as methyl, ethyl, propyl, isopropyl, butyl, hexyl, 2-ethylhexyl, octyl, isooctyl and decyl; aryl, such as phenyl, tolyl, benzyl, beta-phenylethyl, and styryl. To provide optimum release of SPSAs, it is believed necessary that at least 90 percent, and preferably all, of the R' radicals in the fluorosilicone polymer be methyl radicals.

In the above formulae for the fluorosilicone polymer and its siloxane units Z denotes a silicon-bonded curing radical selected from the group consisting of hydrogen, hydroxyl and alkenyl, as delineated above.

In the above formulae for the siloxane units the values of a, b, c and d denote integers, the values of which are as delineated.

The values of m, n, x, y and z for the linear fluorosilicone polymer denote average values, as is well known in the art, and are such that the polymer contains the requisite amount of alkenyl-containing siloxane units and fluorinated siloxane units and has the desired viscosity at 25° C. The values of m, n, m+n, x, y, z and x+y+z thus will vary greatly, depending on the fluorinated siloxane unit content, the structure of the fluorinated radicals and the viscosity of the polymer. As the mol percent of fluorinated siloxane units in the polymer, and/or the size of the fluorinated radicals therein, increases, the viscosity of the polymer increases.

While the values of x, y and z can be as small as one the values of x and y can range to 10,000 and more and the value of z typically is limited to a fraction, such as from 1/100 to 2/10, of the sum of x+y+z.

The fluorosilicone polymers can be prepared by any of several methods disclosed in the art or by the method of this invention, delineated below.

For example, the hydroxy-terminated polymers can be prepared by the method of Johannson, U.S. Pat. No. 3,002,951 or Brown, U.S. Pat. No. 3,179,619. The organo-terminated polymers can be prepared by the method of Pierce et al., U.S. Pat. No.2,961,425. The patents to Johannson, Brown and Pierce et al. are incorporated herein by reference to show how to prepare fluorosilicone polymers.

The vinyl-containing copolymers of the general formula YMe$_2$SiO(Me$_2$SiO)$_x$[RCH$_2$CH$_2$Si(Me)O]$_y$(-MeASiO)$_z$SiMe$_2$Y, wherein the values of x, y and z are each greater than zero, are preferably prepared by the method of this invention, disclosed below.

Specific examples of preferred fluorosilicone polymers of this invention, and the preferred method of Brown, are disclosed in the examples disclosed below.

When formulated with an effective amount of a suitable curing agent the fluorosilicone polymers of this invention can be cured, i.e. converted to the no-smear, no-migration, no-rub-off state, as measured by tests described below.

Suitable curing agents, Component (B), for Component (A) comprise a crosslinking agent, examples of which include, but are not limited to, aliphatically unsaturated compounds to react with silicon-bonded hydrogen curing radicals, and organohydrogen silicon compounds bearing a plurality of silicon-bonded hydrogen atoms to react with silicon-bonded alkenyl curing radicals and/or silicon-bonded hydroxy curing radicals. Additionally, the curing agent typically comprises a curing catalyst to accelerate the reaction of the curing radicals with the crosslinking agent, particularly at elevated temperature.

Examples of aliphatically unsaturated crosslinking agents include organosilicon compounds such as silanes and cyclic, linear and resinous siloxanes which bear a plurality of silicon-bonded alkenyl radicals.

Examples of organohydrogen silicon crosslinking agents include any organosilicon compound which bears a plurality of silicon-bonded hydrogen atoms, such as cyclic, linear and resinous siloxanes, such as methylhydrogencyclopolysiloxanes having the unit formula MeHSiO$_{2/2}$; linear methylhydrogenpolysiloxanes having the formulae Me$_3$SiO(MeHSiO)$_i$(Me$_2$SiO)$_j$-SiMe$_3$ and HMe$_2$SiO(MeHSiO)$_i$(Me$_2$SiO)$_j$SiMe$_2$H where i and j have values of zero or more; branched siloxanes such as (HMe$_2$SiO)$_4$Si and the fluorosilicone crosslinkers disclosed by Holbrook in U.S. Pat. No. 3,344,160; and the resinous crosslinkers disclosed by Blizzard et al. in U.S. Pat. No. 4,310,678, said patents being incorporated herein by reference to further teach the scope and synthesis of said fluorosilicone crosslinkers and said resinous crosslinkers.

Examples of suitable, well known curing catalysts include, but are not limited to, organoperoxides, platinum-group metals and their compounds, and tin and lead salts of carboxylic acids, such as stannous octoate and dibutyltin diacetate.

The curable compositions of this invention preferably comprise a curing agent which comprises a platinum-containing hydrosilylation catalyst and a methylhydrogenpolysiloxane having the formula Me$_3$SiO(MeHSiO)$_e$SiMe$_3$ wherein e has a value of from 30 to 70. A particularly useful platinum-containing catalyst for the curable compositions of this invention is the chloroplatinic acid-vinylsiloxane complex disclosed by Willing in U.S. Pat. No. 3,419,593, hereby incorporated by reference. However, the platinum-containing catalyst can be any of the well known materials that are effective for catalyzing the hydrosilylation reaction of silicon-bonded hydrogen atoms with silicon-bonded vinyl radicals.

The amount of curing agent to be used in the compositions of this invention is not normally critical, it only being necessary to have an effective amount thereof to fully cure the composition, as measured by the tests delineated below. Typically, an effective amount of a curing agent will contain a sufficient amount of crosslinking agent to provide one or more crosslinking radicals for every curing radical in the fluorosilicone polymer. When the curing agent comprises a methylhydrogenpolysiloxane it is preferred that sufficient thereof be used to provide from 1 to 10, preferably from 1 to 4, silicon-bonded hydrogen atoms for every curing radical in the fluorosilicone polymer.

Beyond the need for a complete cure it is usually desirable to use a sufficient amount of a curing catalyst in the curable compositions of this invention to provide a rapid cure rate. The exact amount of said catalyst will depend on the particular catalyst that is used and is not easily predicted. However, for chloroplatinic acid and its complexes, an amount sufficient to provide from 10 to 500 parts by weight of platinum for every one million parts by weight of the fluorosilicone polymer is usually sufficient. Within this range routine experimentation can be used to determine the optimum amount of catalyst needed for any particular cure time.

The curable compositions of this invention can further comprise various amounts of optional components that will not adversely limit the use of the cured composition as a coating composition for the release of PSAs. Examples thereof include reactive components, such as adhesion promoters to improve the bonding of the cured composition to a substrate and catalyst activity attenuators to inhibit the activity of the catalyst at room temperature; and unreactive components such as diluents to decrease the viscosity of the curable composition.

Preferred diluents include halogenated solvents, such as chlorofluorocarbons; esters, such as ethyl acetate; ketones such as methylisobutyl ketone; and ethers, such as dibutyl ether. Preferred catalyst activity attenuators include methylvinylcyclosiloxanes; esters of unsaturated alcohols and/or unsaturated acids, such as diallyl maleate and bis-(2-methoxyisopropyl) maleate; acetylenic compounds, such as methylbutynol; and ene-ynes, such as ethynylcyclohexene. The reader is referred to, for example, the disclosures of U.S. Pat. Nos. 3,445,420; 4,256,870; 4,465,818 and 4,562,096, to further illustrate the optional attenuator component of the compositions of this invention.

The compositions of this invention are particularly useful for coating a substrate, such as a flexible sheet, to render the substrate adhesive releasing. Thus, in another aspect the present invention relates to a method for providing a substrate with a coating that will release pressure sensitive adhesives, said method comprising (i) applying to the surface of said substrate a coating of a coating composition comprising a curable mixture consisting essentially of (A) a fluorosilicone polymer containing an average of at least two silicon-bonded curing radicals per molecule selected from the group consisting of hydrogen, hydroxyl and alkenyl and at least 2 mol percent, based on the total number of siloxane units in the fluorosilicone polymer, of fluorinated siloxane units, any remaining siloxane units in the polymer being non-fluorinated siloxane units; said fluorinated siloxane units having the formula $(RQ)(R')_a(Z)_bSiO_{(3-a-b)/2}$ and said non-fluorinated siloxane units having the formula $(R')_c(Z)_dSiO_{(4-c-d)/2}$ where, in said fluorinated and non-fluorinated siloxane units, R denotes a perfluoroalkyl radical having from 4 to 8 carbon atoms and, additionally, 2 to 3 carbon atoms when the fluorosilicone polymer contains less than 90 mol percent fluorinated siloxane units and 1 carbon atom when the fluorosilicone polymer contains from 7 to 10 mol percent fluorinated siloxane units, Q denotes a divalent hydrocarbon, hydrocarbon ether or hydrocarbon thioether radical linking the R radical to a silicon atom through at least 2 carbon atoms, R' denotes a silicon-bonded, monovalent hydrocarbon radical free of aliphatic unsaturation, Z denotes said silicon-bonded curing radical, $a=0$ to 2, $b=0$ to 2, $a+b=0$ to 2 , $c=0$ to 3, $d=0$ to 3 and $c+d=0$ to 3 and, (B) an effective amount of a curing agent for the fluorosilicone polymer and, (ii) thereafter causing the applied curable mixture to cure.

In the method of this invention the above-delineated curable composition of this invention, including preferred embodiments thereof, is applied to a substrate and cured thereon. The cured coating bonds to the substrate with a force greater than the force needed to remove an adhesive from the coating. The exposed surface of the cured coating is available to receive a normally tacky adhesive, such as a SPSA, and is capable of releasing the adhesive with a force less than, preferably no more than 80% of, its adhesive release force from stainless steel and, with certain compositions, with a force of no more than 400 grams per inch (154.4 newtons per meter), as measured by the Keil method delineated below, and without decreasing the adhesiveness of the PSA by more than 25 percent.

Any solid substrate can be coated by the method of this invention; however, the substrate is typically a flexible sheet material that is to be peeled from a PSA which has been brought into contact therewith. Alternatively, the substrate can be an inflexible substrate to which an adhesive-bearing item is to be adhered and from which it is to be subsequently removed.

As to composition the substrate can be any suitable material; such as synthetic polymer materials such as polyolefins, polyesters, polyamides, polycarbonates, polyacrylates and polysiloxanes; cellulosic materials such as paper, cardboard and wood; metallic materials such as aluminum, steel, copper and silver; and siliceous materials such as glass, tile, ceramic and porcelain.

As to form the substrate typically has a flexible form such as a polymeric film, metal foil, polymeric film-coated metal foil, paper and polymeric film-coated paper. However, as noted above, the substrate can also be an inflexible material, such as metal or glass panel.

The curable composition can be applied by any suitable manner such as by brushing, spreading, spraying, rolling, gravure, kiss roll, air knife or doctor blade.

Once applied the coating composition is caused to cure, typically with the use of heat to accelerate the curing reaction. Any solvents that might be present in the applied coating should be removed from the coating before it is fully cured.

The resulting coated substrate will release PSAs which are brought into adhesive contact therewith. The PSA can be applied to the coated substrate in solution form and the solvent removed therefrom. Alternatively, the PSA can be first devolatilized and then brought into contact with the coated substrate.

In a preferred embodiment the method of this invention is used to coat a flexible release backing, after which the coating is cured and a solution of a PSA is cast thereon. The PSA can be any of the well known adhesives that are used in the art today; such as organic PSAs (OPSAs), such as acrylic-based adhesives and rubber-based adhesives; and silicone PSAs (SPSAs), such as those disclosed in the references noted above. Any of the curable compositions of this invention, delineated above, will release these cast PSAs with a force of no more than 80% of its adhesive release force from stainless steel.

However, if it is desired to release an uncured, solvent-cast SPSA with a force of no more than 200 grams per inch or a heat-cured, solvent-cast SPSA with a force of no more than 400 grams per inch, it appears necessary to limit the curable composition to one wherein the fluorosilicone polymer has the formula $YMe_2SiO(Me_2SiO)_x[RCH_2CH_2Si(Me)O]_y(MeASiO)_z$-$SiMe_2Y$, as delineated above, wherein the values of x, y and z are each greater than zero and are such that the fluorosilicone polymer contains from 1 to 10 mol percent of the alkenyl-containing siloxane units, at least 5 mol percent of the fluorinated siloxane units and the balance dimethylsiloxane units, and the curing agent comprises a mixture of a platinum-containing hydrosilylation catalyst and a methylhydrogenpolysiloxane having the formula $Me_3SiO(MeHSiO)_eSiMe_3$ wherein e has a value of from 30 to 70.

If it is desired to release a solvent-cast, heat-cured SPSA with a force of no more than 200 grams per inch, it appears necessary to limit the curable composition to one wherein the fluorosilicone polymer has the formula $YMe_2SiO(Me_2SiO)_x[RCH_2CH_2Si(Me)O]_y(MeASiO)_z$-$SiMe_2Y$, as delineated above, wherein the values of x, y and z are each greater than zero and are such that the fluorosilicone polymer contains from 3 to 7 mol percent of the alkenyl-containing siloxane units, from 20 to 50 mol percent of the fluorinated siloxane units and has a viscosity of from 100 to 1000 centistokes at 25° C. and the curing agent comprises a platinum-containing hydrosilylation catalyst and a methylhydrogenpolysiloxane having the formula $Me_3SiO(MeHSiO)eSiMe_3$ wherein e has a value of from 30 to 70.

Even so the release of heat-cured, solvent cast SPSAs with the stated release forces is not guaranteed; it is merely made possible with the limited compositions of this invention. It is necessary to apply the curable release coating to the substrate in a sufficiently thick layer and in a sufficiently uniform manner to substantially coat the entire surface of the substrate that is to be contacted with the solvent-cast, heat-curable SPSA. While this manner of coating is relatively easy for some substrates, such as hard, smooth substrates that are easily wetted by the coating composition, it requires more attention when the substrate is porous and/or rough and/or resistant to wetting by the composition.

In the method of this invention it is preferred to uniformly coat the substrate so as to provide a layer of cured composition having a weight of at least 0.1 pound per ream, preferably at least 0.3 pound per ream, and most preferably from 0.5 to 1.0 pound per ream of flexible substrate; a ream being equal to 3,000 square feet of coated surface. While it is possible to use heavier coating weights there is no advantage in doing so and, at least from a cost viewpoint, is undesirable.

The flexible release backing of this invention has been invented to be used to protect PSAs and, in particular, SPSAs. Thus, in a related aspect the present invention relates to a laminated article of manufacture comprising a layer of pressure sensitive adhesive and the coated substrate of this invention, releaseably adhered by a coated surface thereof to at least a portion of the layer of pressure sensitive adhesive.

The PSA can be, for example, a free layer that is to be transferred to a support. In this type of laminated article the laminate typically further comprises a second release layer that is in contact with the PSA, such as the next turn if the article has the form of a roll or a separate release backing if the article has the form of a sheet. In any event the laminate possesses the property of differential release whereby one of the release layers is more easily released from the PSA than the other release layer. The composition and method of this invention are particularly useful in preparing laminates of this type because differing release forces are available through the use of coating compositions having different release forces. Additionally, differing release forces are inherently available with any composition when the PSA is solvent-cast onto one coated substrate and brought into adhesive contact with another substrate, identically coated, after it has been freed of solvent and, optionally, cured. Of course, a combination of these two methods can also be used to provide differential release.

The PSA can be, for example, durably adhered to an item that is to be ultimately adhered to a support. Examples thereof include, but are not limited to, medical items, such as transdermal drug delivery items, such as nitroglycerine patches for the control of angina pain and dimenhydrinate patches for the control of motion sickness, and ostomy devices; trim items, such as decorative emblems and protective strips that are applied, for example, to vehicles; and decals, such as instrument panel templates and labels. As noted above, these articles can be prepared by applying the PSA to the release backing and thereafter durably adhering the item to the PSA, or vice versa.

The compositions, methods and articles of this invention are based, in part, on novel fluorosilicone copolymers. Although the art discloses many fluorosilicone copolymers, the alkenyl-containing copolymers of this invention are not apparent therein.

Thus, the present invention further relates to a fluorosilicone copolymer having the formula $YMe_2SiO(Me_2SiO)_x[RCH_2CH_2Si(Me)O]_y(MeASiO)_zSiMe_2Y$ wherein Y denotes Me or A, A denotes an omega-alkenyl radical, Me denotes the methyl radical, R denotes a perfluoroalkyl radical having from 1 to 8 carbon atoms, the values of x, y and z are each greater than zero and are such that the fluoro-silicone polymer contains from 1 to 10 mol percent alkenyl-containing siloxane units and the balance dimethylsiloxane units.

The several symbols that are used to delineate the fluorosilicone polymers of this invention have the general and preferred meanings denoted above. In addition, the preferred fluorosilicone polymers of this invention are the same as those delineated above for the curable compositions of this invention.

As stated above, the copolymers of this invention can be prepared by the process of this invention. Said process comprises (I) hydrolyzing a mixture comprising one or more fluorinated silanes having the formula $(RQ)(R'')_fSiX_{(3-f)}$ and one or more non-fluorinated silanes having the formula $R''_gSiX_{(4-g)}$ where, in said fluorinated and non-fluorinated silanes, R denotes a perfluoroalkyl radical having from 1 to 8 carbon atoms, Q denotes a divalent hydrocarbon, hydrocarbon ether or hydrocarbon thioether radical linking the R radical to the silicon atom through at least 2 carbon atoms, R'' denotes a silicon-bonded radical selected from the group consisting of monovalent hydrocarbon radicals and hydrogen atoms, f has a value of 0, 1 or 2, g has a value of 0, 1, 2, or 3 and X denotes a silicon-bonded hydrolyzable radical, (II) mixing with the hydrolyzed mixture obtained in (I) an organopolysiloxane having the average unit formula $R''_hSiO_{(4-h)/2}$ wherein R'' has the meaning noted above and h has an average value of from 1 to 3 and (III) contacting the mixture of (II) with an effective amount of a siloxane-equilibrating catalyst for a period of time sufficient to form the desired fluorosilicone polymer.

In step (I) of the process of this invention a cohydrolyzate of a mixture of fluorinated and non-fluorinated silanes is first prepared which has greater compatibility with polydimethylsiloxanes than does the hydrolyzate of the fluorinated silanes alone. It has been found that cohydrolyzates having as much as 90 percent fluorinated siloxane units have this improved compatibility with polydimethylsiloxanes. However, it is desirable to incorporate as much non-fluorinated silane into the hydrolyzate as possible, based on the composition of the polymer to be prepared and the compatibility of the silanes. Thus, for the purpose of preparing fluorosilicone polymers of this invention containing up to 50 mol percent fluorinated siloxane units it is preferred to prepare a cohydrolyzate having up to two fluorinated siloxane units for every one non-fluorinated siloxane unit and then to introduce any additional non-fluorinated siloxane units, into the cohydrolyzate in the second step of this process.

The silanes that are mixed and cohydrolyzed in (I) bear at least one hydrolyzable radical (X) per molecule. Although the hydrolyzable radicals are preferably chlorine atoms it is believed that they can also be any other halogen atom, an alkoxy radical such as methoxy or ethoxy, an acyloxy radical such as acetoxy or an amino radical such as $NH_2$ or NH. Examples of suitable fluorinated silanes include $RQMeYSiX$ and $RQYSiX_2$, such as $RQ(Me)SiCl_2$, $RQ(Vi)SiCl_2$, $RQ(Me)_2SiCl$ and $RQ(Me)(Vi)SiCl$. Examples of suitable non-fluorinated siloxane units include $YMe_2SiX$ and $MeYSiX_2$, such as $Me_2SiCl_2$, $MeViSiCl_2$, $Vi(Me)_2SiCl$ and $Me_3SiCl$.

The silanes are preferably dissolved in a water-insoluble solvent such as a dialkylether and the resulting solution added to water with vigorous agitation. If halosilanes are not used it is preferred that the water be made acidic with a mineral acid such as hydrochloric acid.

The resulting hydrolyzate is then freed of any solvent and mixed with an organopolysiloxane having the formula $R''_hSiO_{(4-h)/2}$, examples of which include cyclic siloxanes having the formulae $(Me_2SiO)_i$ and $(MeASiO)_i$, wherein i has a value of at least 3, such as $[(Me)_2SiO]_{3-10}$ and $[(Me)(Vi)SiO]_{3-10}$; and linear siloxanes having the formula $YMe_2SiO(Me_2SiO)_j(MeViSiO)_k$-$SiMe_2Y$, wherein j and k have values of zero or more, such as $Me_3SiO(Me_2SiO)_{0-10}(MeViSiO)_{0-10}SiMe_3$ and $ViMe_2SiO(Me_2SiO)_{0-10}(MeViSiO)_{0-10}SiMe_2Vi$.

The mixture of hydrolyzate and organopolysiloxane is brought into contact with a siloxane-equilibrating catalyst such as an acidic catalyst such as sulfuric acid-treated clays or ion-exchange resins, fluoroalkanesulfonic acids, perfluoroalkanesulfonic acids or mineral acids such as hydrochloric acid or sulfuric acid; or a basic catalyst such as alkali metal hydroxides, alkali metal silanolates or tetraalkyl ammonium or phosphonium hydroxides or silanolates. The temperature of the mixture that is contacted with the acid is not critical since copolymer formation will occur at room temperature if a sufficient amount of time is allowed for the reaction to occur. However, it is preferred to accelerate this reaction by heating the reaction mixture, for example to 100 to 200° C.

After the fluorosilicone polymer has been formed, as indicated by no further change in the viscosity of the reaction mixture, the catalyst is preferably deactivated, such as by neutralization; although this step is not necessary. It is also desirable, but not necessary, to remove volatile materials from the fluorosilicone polymer before it is used in a curable composition of this invention.

The following examples are disclosed to further teach how to practice the present invention and should not be taken as limiting the invention, which is properly delineated by the appended claims.

All parts and percentages are by weight unless otherwise noted. Me and Vi denote methyl and vinyl, respectively. Temperatures are degrees Celsius. Viscosities are at 25° Celsius.

The state of cure of an adhesive-release coating was determined by the ruboff, migration and smear tests.

Smear was measured by lightly rubbing the coating with a finger and observing the coating for a hazy appearance. The amount of haze was estimated and rated as none, very slight, slight, moderate or gross. A fully cured coating displays no haze and therefore has no smear.

Ruboff was measured by vigorously rubbing the coating with the index finger tip, trying to remove the coating from the paper. The amount of ruboff was estimated and rated as none, very slight, slight, moderate or gross. A fully cured coating displays no ruboff.

Migration was measured by placing a strip of No. 610 Scotch ® brand transparent tape on the coating, adhesive-bearing surface in contact with the coating, and rubbing the strip 5 to 20 times with a finger to adhere the strip to the coating. The strip was then removed and its adhesive-bearing surface doubled back on itself and slowly separated. The difference in force, relative to the force needed to separate a doubled, unexposed strip, was then estimated and rated as none, very slight, slight, moderate or gross. A fully cured coating displays no difference and thus has no migration.

Subsequent Adhesion of an adhesive that had been removed from a release surface was measured by applying the adhesive to a clean stainless steel panel and measuring the force required to remove the tape therefrom.

Adhesion of an adhesive was measured by applying the adhesive, that had never been applied to a release surface, to a clean stainless steel panel and measuring the force required to remove the tape therefrom.

The following adhesives are referenced in the following examples.

Adhesive No. 1—A non-curing SPSA available from Dow Corning Corporation as DOW CORNING ®355 Adhesive.

Adhesive No. 2—A non-curing SPSA available from Dow Corning Corporation as DOW CORNING ®X7-3355 Adhesive.

Adhesive No. 3—A curable SPSA available from Dow Corning Corporation as DOW CORNING ®Q2-7330 Adhesive Adhesive No. 4—A SPSA tape prepared by applying and curing Adhesive No. 3 onto 2-mil polyester film.

Adhesive No. 5—An amine-resistant, non-curing SPSA available from Dow Corning Corporation as DOW CORNING ® X7-2920 Adhesive.

Adhesive No. 6—A SPSA tape prepared by applying and curing GE ® 590 Adhesive, available from General Electric Company, to polyimide film.

Adhesive No. 7—A SPSA tape prepared by applying and curing Adhesive No. 3 onto 1-mil polyimide film.

EXAMPLES 1A TO 9I

These examples illustrate the present invention, including the process for synthesizing a fluorosilicone polymer, several fluorosilicone polymers, several curable compositions, the method for coating a substrate to prepare a release liner for a silicone pressure sensitive adhesive and a laminate of this invention. Example 1A uses Polymer A and Composition 1; Example 2B uses Polymer B and Composition 2, etc.

A mixture of 510.1 parts of heptane, 123.4 parts of $Me_2SiCl_2$ and 517.7 parts of $(CF_3CF_2CF_2CF_2CH_2CH_2)(CH_3)SiCl_2$ was slowly added to 1348.5 parts of stirred water. An exotherm to 55° resulted. The resulting hydrolysis mixture was stirred for 45 minutes and was then allowed to stand until a two-phase system resulted. The aqueous phase was separated and discarded. The organic phase was washed once with 1000 parts of 10% aqueous NaCl, after which the organic phase was found to be neutral to litmus paper. The heptane was then removed from the organic phase at a pressure of 150 mm Hg and 40° to 55° and the residue was freed of additional volatile material by heating to 80° at maximum vacuum. The residue, 501 grams, was a copolymer of 60 mols of $(CF_3CF_2CF_2CF_2CH_2CH_2)(CH_3)SiO_{2/2}$ siloxane units and 40 mols of $(CH_3)_2SiO_{2/2}$ siloxane units. This cohydrolyzate was used to prepare several fluorosilicone polymers as follows.

A mixture of 294.62 parts of the 60/40 cohydrolyzate, 91.27 parts of $[(Me_2)SiO]_4$, 11.88 parts of $[(Me)(Vi)SiO]_5$, 2.23 parts of $Me_3SiO(Me_2SiO)_{10}SiMe_3$ and 0.4 part of $CF_3SO_3H$ catalyst was heated at 70° for 5 hours, after which it was cooled, mixed with 4 parts of $NaHCO_3$ and 5 parts of diatomaceous earth and pressure-filtered. The filtrate was devolatilized at 150 degrees/2 mm Hg for 15 minutes. The fluorosilicone polymer (Table 1, A) had a viscosity of 521 centistokes, 38.6 mol % fluorinated siloxane units and 4.4 mol % in-the-chain vinyl siloxane units.

In a similar manner, except for using appropriate amounts of the above-noted siloxane reactants, the fluorosilicone polymers B to I, listed in Table 1, were also prepared.

A control polymer containing trimethylsiloxane units, dimethylsiloxane units and 4 mol % methylvinylsiloxane units was prepared by KOH-catalyzed equilibration of the appropriate cyclosiloxanes and the dodecasiloxane noted above.

Curable coating compositions of this invention were prepared by mixing 5 parts of each of the polymers listed in Table 1 with 95 parts of trichlorotrifluoroethane, 0.1 part of a complex of divinyltetramethyldisiloxane and $H_2PtCl_6$ and a sufficient amount of $Me_3SiO(-MeHSiO)_{50}SiMe_3$ to provide the necessary amount of silicon-bonded hydrogen atoms. These compositions 1 to 9 are summarized in Table 2. The control composition was similarly coated and cured.

Each of these curable compositions was coated onto a piece of 2-mil polyester film using a #8 Mayer Rod and the coated film was heated at 140° for 30 to 60 seconds to cure the coating. Thereafter solutions of Adhesives 1, 2, 3 and 5, noted above, were cast onto the cured coatings and onto an uncoated sample of film with a Bird Bar at a thickness sufficient to provide a dry thickness of 1.5 mils of adhesive. Adhesives 1, 2 and 5 were allowed to dry for 15 minutes before a 1 mil polyester film was laminated to the adhesive using a 4.5 pound roller. Adhesive 3 was given an additional heat-curing step for 5 minutes at 163° before the polyester film was laminated thereto. Adhesive 4 was applied as a tape.

The laminates were evaluated for release by cutting the laminates into 1×6 inch strips and the laminate was pulled apart at a rate of 12 inches/minute using a Keil Tester. The values recorded in Table 2 are the average of 5 readings taken during the course of one pull per sample. The Keil Tester is described in TAPPI, Vol. 43, No. 8., pages 164A and 165A (August 1960).

These examples illustrate that the compositions of this invention having from 10 to 50 mol % fluorinated siloxane units readily release solvent-cast SPSAs with little or no loss of adhesion of the released adhesive. Additionally, compositions of this invention which contain from 30 to 50 mol % fluorinated siloxane units release curable SPSAs with a force of less than 400 g/in. after having been solvent-cast and heat-cured thereon.

Of course it will be apparent to the practitioner of the PSA laminate art that the 2-mil polyester film can be replaced with a trim item, a transdermal drug delivery patch or a second release layer to produce additional laminates of this invention.

TABLE 1

| Polymer | Visc., cs. | D.P. | RQ(Me)SiO, mol % | Vi(Me)SiO, mol % |
|---------|-----------|------|------------------|------------------|
| A | 521 | 329 | 38.6 | 4.4 |
| B | 176 | 86 | 30.0 | 5.2 |
| C | 660 | 426 | 49.8 | 6.9 |
| D | 2160 | 1017 | 31.0 | 2.9 |
| E | 365 | 162 | 29.5 | 3.3 |
| F | 870 | 438 | 47.4 | 8.8 |
| G | 145 | 742 | 53.4 | 5.5 |
| H | 6400 | 825 | 10.3 | 4.7 |
| I | 349 | 148 | 10.3 | 4.6 |
| Control | — | — | 0 | 4.1 |

TABLE 2

| Comp. | Poly. | SiH/SiVi | Release, g/in. | | | | | S.A., g/in.* | | | | |
|-------|-------|----------|-------|-------|-------|-------|-------|-------|-------|-------|-------|-------|
| | | | Adh. 1 | Adh. 2 | Adh. 3 | Adh. 4 | Adh. 5 | Adh. 1 | Adh. 2 | Adh. 3 | Adh. 4 | Adh. 5 |
| 1 | A | 4.00 | 5 | 5 | 56 | 5 | 17 | 946 | 324 | 746 | 618 | 870 |
| 2 | B | 4.00 | 5 | 16 | 292 | 72 | 5 | 1114 | 258 | 780 | 988 | 1228 |
| 3 | C | 2.50 | 5 | 26 | 222 | 90 | 5 | 1110 | 298 | 798 | 1022 | 1016 |
| 4 | D | 3.25 | 5 | 126 | 270 | 48 | 5 | 742 | 258 | 676 | 942 | 660 |
| 5 | E | 3.25 | 5 | 6 | 202 | 16 | 5 | 1060 | 274 | 688 | 938 | 806 |
| 6 | F | 3.25 | 21 | 40 | 402 | 110 | 5 | 1126 | 312 | 674 | 1016 | 1226 |
| 7 | G | 3.25 | 5 | 20 | 158 | 50 | 5 | 1134 | 284 | 828 | 844 | 822 |
| 8 | H | 3.25 | 5 | 24 | 542 | 158 | 5 | 1152 | 310 | 722 | 1010 | 1112 |
| 9 | I | 3.25 | 5 | 16 | 564 | 140 | 5 | 1268 | 308 | 722 | 976 | 1012 |
| Control | — | — | 600 | 278 | 990 | 484 | 660 | 876 | 292 | 630 | 836 | 1024 |
| None | — | — | 1024 | 362 | 914 | 1288 | 1230 | — | — | — | — | — |

*S.A. = Subsequent Adhesion

EXAMPLES 10J to 18R

These examples illustrate the preparation of fluorosilicone polymers having vinyl curing radicals in the chain and on the polymer ends and $C_4F_9$, $C_6F_{13}$ or $C_8F_{17}$ radicals bonded to silicon; the use of these polymers to prepare curable compositions and the use of these compositions to coat a substrate to release SPSAs. Example 10J uses Polymer J and Composition 10; 11K uses Polymer K and Composition 11, etc.

Thirty molar parts of $C_8F_{17}CH_2CH_2Si(Me)Cl_2$, 65 molar parts of $Me_2SiCl_2$ and 5 molar parts of MeViSiCl_2 were dissolved in an equal volume of diethyl ether and the resulting solution was gradually added to rapidly stirred water at a temperature of around 40°. The organic phase was separated, was washed to neutrality and ether was removed by distillation. The residue was mixed with 0.6 molar part of vinyldimethyl- siloxane-endblocked nonadimethylsiloxane and 2 percent by weight, based on the weight of the siloxanes, of a sulfonic acid-functional ion exchange catalyst and the mixture was heated at 115° for 4 hours and at 80° for 16 hours under a nitrogen purge to remove water. The resulting fluorosilicone copolymer (Table 3, J) was then filtered and devolatilized at 210° and 5 mm Hg.

In a similar manner, except for using appropriate amounts and types of siloxane reactants, the fluorosilicone polymers K to R, listed in Table 3, were also prepared.

Nine coating compositions of this invention were prepared by mixing 4.75 parts of a fluorosilicone polymer J to R with 0.24 part of the methylhydrogenpolysiloxane, 0.09 part of the catalyst and 94.92 parts of trifluorotrichloroethane. The coating compositions were coated onto 2 mil polyester film, The coatings were cured; the cured coatings were overlaid with SPSA and the SPSA laminated with polyester film as noted in the above Examples. Release and Subsequent Adhesion testing was also performed on these laminates and the results are summarized in Table 4. The comparison composition was Scotchpak ™, a commercially available release liner from 3M Company, Minneapolis, MN.

TABLE 3

| Poly. | R | Polymer Composition, Mol % | | | | Visc., cs. |
|---|---|---|---|---|---|---|
| | | (RCH$_2$CH$_2$)(Me)SiO | Me$_2$SiO | ViSiO | ViMe$_2$SiO | |
| J | C$_8$F$_{17}$ | 29.2 | 65.5 | 4.7 | 0.6 | 650 |
| K | C$_8$F$_{17}$ | 19.4 | 75.2 | 4.8 | 0.6 | 742 |
| L | C$_8$F$_{17}$ | 9.7 | 84.9 | 4.7 | 0.7 | 433 |
| M | C$_6$F$_{13}$ | 29.1 | 65.4 | 4.9 | 0.6 | 851 |
| N | C$_6$F$_{13}$ | 19.4 | 75.2 | 4.8 | 0.6 | 521 |
| O | C$_6$F$_{13}$ | 9.7 | 84.9 | 4.8 | 0.6 | 371 |
| P | C$_4$F$_9$ | 29.2 | 65.4 | 4.8 | 0.6 | 184 |
| Q | C$_4$F$_9$ | 19.3 | 75.2 | 4.8 | 0.7 | 126 |
| R | C$_4$F$_9$ | 9.7 | 84.9 | 4.8 | 0.6 | 140 |

TABLE 4

| Comp. | Poly. | Release, g/in. | | | | S.A., g/in.* | | | |
|---|---|---|---|---|---|---|---|---|---|
| | | Adh. 1 | Adh. 3 | Adh. 7 | Adh. 6 | Adh. 1 | Adh. 3 | Adh. 7 | Adh. 6 |
| 10 | J | 5 | 190 | 100 | 32 | 1102 | 908 | 462 | 610 |
| 11 | K | 5 | 130 | 108 | 32 | 970 | 850 | 496 | 612 |
| 12 | L | 5 | 144 | 80 | 64 | 934 | 856 | 464 | 680 |
| 13 | M | 42 | 162 | 116 | 106 | 1012 | 902 | 458 | 634 |
| 14 | N | 64 | 166 | 116 | 134 | 824 | 836 | 466 | 640 |
| 15 | O | 118 | 290 | 136 | 158 | 998 | 828 | 438 | 636 |
| 16 | P | 80 | 238 | 82 | 90 | 982 | 820 | 454 | 674 |
| 17 | Q | 5 | 184 | 72 | 100 | 1016 | 826 | 432 | 654 |
| 18 | R | 5 | 192 | 138 | 218 | 1058 | 858 | 466 | 646 |
| None | — | 928 | 914 | 450 | 618 | 1040 | — | 388 | 640 |
| ** | — | 8 | 428 | 5 | 10 | 846 | 758 | 446 | 606 |

*S.A. = Subsequent Adhesion
**Comparison Composition.

EXAMPLES 19 and 20

Fluorosilicone polymers containing 10, 20 and 30 mol percent trifluoropropylmethylsiloxane units and 10 mole percent vinylmethylsiloxane units were prepared by heating a mixture of trifluoropropylmethylcyclotrisiloxane, dimethylcyclotetra-siloxane, methylvinylcyclopentasiloxane and methyl-terminated dimethylnonasiloxane in the presence of 2 percent by weight, based on the weight of the siloxanes, of CF$_3$SO$_3$H for 5 hours at 75°. The reaction product was then neutralized with NaHCO$_3$, filtered and devolatilized at 150° and 2 mm Hg pressure.

A fluorosilicone polymer containing 7.5 mol percent trifluoropropylmethylsiloxane units and 1 mol percent vinyl-methylsiloxane units was similiarly prepared except by using KOH instead of CF$_3$SO$_3$H.

A fluorosilicone polymer containing 80 mol percent trifluoropropylmethylsiloxane units and vinyldimethylsuloxane terminating units was prepared similarly except the nonasiloxane was vinyl terminated instead of methyl terminated and vinylmethylcyclopentasiloxane was omitted.

A hydroxyl-terminated fluorosilicone polymer containing 100 mol percent trifluoropropylmethylsiloxane units and having a viscosity of 49,400 cs was prepared by heating trifluoropropylmethylcyclotrisiloxane in the presence of KOH in the well known manner.

Six curable coating compositions were prepared by mixing 5 parts of each of these polymers with 95 parts of trichlorotrifluoroethane and 0.1 part of a complex of divinyltetramethyldisiloxane and H$_2$PtCl$_6$ and 0.25 part of Me$_3$SiO(MeHSiO)$_{50}$SiMe$_3$. The compositions were coated on polyester film, cured, coated with adhesive and tested for adhesive release as described above. The results of these experiments, summarized in Table 5, show that compositions containing from about 7 to 10 mol percent trifluoropropyl radicals release SPSAs with an unexpectedly low force.

TABLE 5

| | Polymer Composition, Mol % | | | Release, g/in. | | |
|---|---|---|---|---|---|---|
| EB | Me$_2$SiO | (Me)(CF$_3$CH$_2$CH$_2$)SiO | (MeViSiO) | Adh. 1 | Adh. 2 | Adh. 5 |
| Me* | 91.5 | 7.5 | 1 | 49 | 84 | 8 |
| Me** | 80 | 10 | 10 | 7 | 162 | 126 |
| Me | 70 | 20 | 10 | 942 | 432 | 1310 |
| Me | 60 | 30 | 10 | 680 | 458 | 900 |
| Vi | 19 | 80 | 1 | 1064 | 554 | 1114 |
| OH*** | 0 | 100 | 0 | 242 | 212 | 230 |

*Example 19
**Example 20
***Composition of Keil, U.S. Pat. No. 3,050,411. Also releases Adhesive Nos. 3 and 4 with forces of 512 and 110 grams per inch, respectively.

EXAMPLES 21 and 22

A mixture of 500 parts of dibutylether, 3.81 parts of Me$_2$SiCl$_2$, 16.65 parts of MeViSiCl$_2$ and 479.54 parts of (CF$_3$CF$_2$CF$_2$CF$_2$CH$_2$CH$_2$)(CH$_3$)SiCl$_2$ was slowly added to 800 parts of stirred water. After being washed, filtered and devolatilized in the usual manner a 99.66 portion of the hydrolysis product was mixed with 0.34 part of 2 cs. methyl-terminated polydimethylsiloxane fluid and 0.1 part of CF$_3$SO$_3$H and heated at 70° for 3 hours. The reaction product was neutralized and filtered to provide a fluorosilicone polymer containing 90 mol percent fluorinated siloxane units, 8 mol percent methylvinylsiloxane units and 2 mol percent dimethylsiloxane units. A 95.53 part portion of the hydrolysis product was mixed with 4.08 parts of dimethylcyclotetrasiloxane and 0.39 part of the 2 cs fluid and process as noted to provide a fluorosilicone polymer containing 75 mol percent fluorinated siloxane units, 7 mol percent methylvinylsiloxane units and 18 mol percent dimethylsiloxane units. When these polymers were tested for adhesive release as described in Example 1A the results shown in Table 6 were obtained. A comparison of these examples with those in Table 5 show that the compositions of this invention having up to 90 mol percent fluorinated siloxane units have unexpectedly good SPSA release in view of the teachings of the art.

TABLE 6

| Polymer Composition, Mol % | | | Release, g/in. | | |
|---|---|---|---|---|---|
| Me$_2$SiO | (Me)(C$_4$F$_9$CH$_2$CH$_2$)SiO | (MeViSiO) | Adh. 1 | Adh. 2 | Adh. 3 |
| 2 | 90 | 8 | 12 | 104 | 420 |
| 18 | 75 | 7 | 11 | 54 | 284 |

EXAMPLE 23

A fluorosilicone polymer containing 2 mol % fluorinated siloxane units and 10 mol % vinylmethylsiloxane units was prepared in the same manner as described in Examples 1A to 9I, except that a 50/50 hydrolyzate was used instead of the 60/40 hydrolyzate. When this polymer was formulated, coated, cured and overlaid with adhesive as described above Adhesive Nos. 1, 2, 3, 4 and 5 were released with forces of 280, 106, 1056, 418 and 332 grams per inch, respectively. Thus, while this curable composition has little utility for providing a release coating for releasing Adhesive No. 3 it is useful for releasing solvent-cast SPSAs of the non-curing type.

EXAMPLES 24 to 26

When Composition Nos. 16P, 17Q and 18R were formulated with 0.12%, based on the weight of the fluorosilicone polymer, of an organohydrogensiloxane having the average formula Me$_3$SiO(Me$_2$SiO)$_3$(MeHSiO)$_5$SiMe$_3$ instead of the one shown, the curable composition provided a coating that released Adhesive Number 3 with forces of 336, 310 and 392 grams per inch, respectively.

EXAMPLES 27

A fluorosilicone polymer was prepared by copolymerizing 95 parts of the 60/40 cohydrolyzate described in Example 1A, 29.43 parts of [(Me$_2$)SiO]$_4$, 3.83 parts of [(Me)(Vi)SiO]$_5$, 3.58 parts of Me$_3$SiO(Me$_2$SiO)$_{10}$SiMe$_3$ and 0.66 part of KOH catalyst was heated at 140° for 5 hours, after which it was cooled, mixed with 0.71 part of acetic acid and 5 parts of diatomaceous earth and pressure-filtered. The filtrate was devolatilized at 200°/2 mm Hg for 15 minutes. The fluorosilicone polymer had a viscosity of 272 centistokes, 60.79 wt% fluorinated siloxane units and 3.44 wt% in-the-chain vinyl siloxane units.

When this polymer was formulated, coated, cured and laminated with adhesives, as described in Example 1A, it was found to release Adhesive No. 1 with a force of 5 grams per inch and Adhesive No. 3 with a force of 332 grams per inch.

EXAMPLE 28

Example 27 was repeated, except that the polymer had a viscosity of 590 cs. and 65.34 wt% fluorinated siloxane units because, for its preparation, only 1.79 parts of the 2 cs fluid was used and the amount of polydimethylcyclosiloxane was increased to 30.47 parts. Release values of 5 and 328 grams per inch were measured for Adhesive Nos. 1 and 3, respectively.

EXAMPLE 29

Example 27 was repeated, except that 0.04 part of tetrabutylphosphonium silanolate was used instead of the KOH. The resulting polymer had a viscosity of 203 cs. and contained 59.86 wt % fluorinated siloxane units and 3.44 wt % in-the-chain vinyl siloxane units. When this polymer was formulated, coated, cured and laminated as noted in Example 1A Adhesive Nos. 1 and 3 were released with forces of 5 and 240 grams per inch, respectively.

EXAMPLE 30

A solution consisting of 31.17 parts of heptane, 1.59 parts of Me$_3$SiCl, 15.0 parts of Cl$_2$MeSi(CH$_2$)$_3$OCF(CF$_3$)$_2$ and 30.29 parts of Me$_2$SiCl was added to 160.2 parts of rapidly stirred distilled water over a period of 17 minutes and the resulting mixture was stirred for 1 hour. The two-phase system was separated and the organic phase was washed with an equal weight of 10% aqueous NaCl. The dried aqueous phase was then treated with 0.1 part of trifluoromethane sulfonic acid and heated at 72° overnight. The solution was neutralized with NaHCO, filtered and freed of volatile materials by heating to 150° at 10 mm of Hg pressure to give a polysiloxane having a viscosity of 36.5 centistokes. This polysiloxane, 10.32 parts, was then heated overnight at 70° with 3.18 parts of polydimethylcyclosiloxane and 0.75 part of polymethylvinylcyclosiloxane, in the presence of CF$_3$SO$_3$H. The reaction mixture was neutralized, filtered and devolatilized at 200° and 40 mm of Hg pressure to provide a polysiloxane having 10 mol % fluorinated siloxane units and 6 mol % vinyl siloxane units which, when applied and cured to a substrate, released Adhesive Nos. 1, 2, 3, 4 and 5 with release forces of 5, 78, 670, 180 and 7 grams per inch, respectively.

EXAMPLE 31

A mixture of 0.048 part of Me$_3$SiCl, 0.745 part of MeViSiCl$_2$, 9.0 parts of (CF$_3$)$_2$CFO(CH$_2$)SiCl$_2$, 37.21 parts of Me$_2$SiCl$_2$ and 12.2 parts of heptane was added to 53.5 parts of rapidly stirred water over a period of 10 minutes and the resulting cohydrolyzate was stirred for 1 hour. The organic phase was separated, washed, filtered and devolatilized at 80° and at a pressure of 50 mm of Hg. The residue was then treated with 0.012 part of CF$_3$SO$_3$H at 70° for 17 hours and then with NaHCO$_3$ and filtered The filtrate was devolatilized to give a polysiloxane fluid having 30 mol % fluorinated siloxane units and 6 mol % vinyl siloxane units. This fluorosilicone fluid was found to release Adhesive No. 3 with a force of 320 grams per inch when applied and cured onto a polyester film substrate.

That which is claimed is:

1. Coated substrate provided by a method comprising
 (i) applying to the surface of said substrate a coating of a coating composition comprising a curable mixture consisting essentially of
  (A) a fluorosilicone polymer containing an average of at least two silicon-bonded curing radicals per molecule selected from the group consisting of hydrogen, hydroxyl and alkenyl and at least 2 mol percent, based on the total number of siloxane units in the fluorosilicone polymer, of fluorinated siloxane units, any remaining siloxane units in the polymer being non-fluorinated siloxane units; said fluorinated siloxane units having the formula $$(RQ)(R')_a(Z)_b SiO_{(3-a-b)/2}$$

and said non-fluorinated siloxane units having the formula $$(R')_c(Z)_d SiO_{(4-c-d)/2}$$

where, in said fluorinated and non-fluorinated siloxane units, R denotes a perfluoroalkyl radical having from 4 to 8 carbon atoms and, additionally, 2 to 3 carbon atoms when the fluorosilicone polymer contains less than 90 mol percent fluorinated siloxane units and 1 carbon atom when the fluorosilicone polymer contains from 7 to 10 mol percent fluorinated siloxane units, Q denotes a divalent hydrocarbon, hydrocarbon ether or hydrocarbon thioether radical linking the R radical to a silicon atom through at least 2 carbon atoms, R' denotes a silicon-bonded, monovalent hydrocarbon radical free of aliphatic unsaturation, Z denotes said silicon-bonded curing radical, $a = 0$ to 2, $b = 0$ to 2, $a+b = 0$ to 2, $c = 0$ to 3, $d = 0$ to 3 and $c+d = 0$ to 3 and, (B) an effective amount of a curing agent for the fluorosilicone polymer and, (ii) thereafter causing the applied curable mixture to cure.

2. The substrate of claim 17, wherein the substrate is selected from the group consisting of polymeric film, metal foil, polymeric film-coated metal foil, paper and polymeric film-coated paper.

3. An article of manufacture a laminate comprising a layer of pressure sensitive adhesive and the coated substrate of claim 2, releasably adhered by a coated surface thereof to at least a portion of the layer of pressure sensitive adhesive.

4. The article of manufacture of claim 3 wherein the pressure sensitive adhesive is a silicone pressure sensitive adhesive.

5. A coated substrate according to claim 1 wherein the fluorosilicone polymer consists of siloxane units selected from the group consisting of $YMe_2SiO_{1/2}$ siloaxane units, $RQMeYSiO_{1/2}$ siloaxane units, $MeYSiO_{2/2}$ siloxane units and $RQYSiO_{2/2}$, siloxane units; wherein Y denotes Me or A, A denotes an omega-alkenyl radical and Me denotes the methyl radical and the curing agent comprises an organohydrogen silicon compound.

6. A coated substrate according to claim 5 that will release silicone pressure sensitive adhesives with a force of no more than 200 grams per inch, wherein the fluorosilicone polymer has the formula $$YMeISiO(Me_2SiO)_x\{RCH_2CH_2Si(Me)O\}_y(MeASiO)_zSiMe_2Y$$

wherein the values of x, y and z are each greater than zero and are such that the fluorosilicone polymer contains from 1 to 10 mol percent alkenyl-containing siloxane units, at least 5 mol percent fluorinated siloxane units and the balance dimethylsiloxane units, and the curing agent comprises a platinum-containing hydrosilylation catalyst and a methylhydrogenpolysiloxane having the formula $$Me_3SiO(MeHSiO)_eSiMe_3$$

wherein e has the value of from 30 to 70.

7. A coated substrate according to claim 6 wherein the ratio of silicon-bonded hydrogen atoms to silicon-bonded alkenyl radicals has a value of from 1/1 to 4/1.

8. A coated substrate according to claim 7 wherein the fluorinated siloxane units have the formula $$(CF_3CF_2CF_2CF_2CH_2CH_2)(CH_3)SiO_{2/2}$$

and all A radicals are vinyl.

9. A coated substrate according to claim 5 that will release silicone pressure sensitive adhesives, solvent-cast and heat-cured thereon, with a force of no more than 200 grams per inch, wherein the fluorosilicone polymer has the formula $YMe_2SiO(Me_2SiO)_x\{RCH_2CH_2Si(Me)O\}_y(MeASiO)_zSiMe_2Y$ wherein the values of x, y and z are each greater than zero and are such that the fluorosilicone polymer contains from 3 to 7 mol percent alkenyl-containing siloxane units, from 20 to 50 mol percent fluorinated siloxane units and the balance dimethylsiloxane units, and has a viscosity of from 100 to 1,000 centistokes at 25 degrees C. and the curing agent comprises a platinum-containing hydrosilylation catalyst and a methylhydrogenpolysiloxane having the formula $$Me_3SiO(MeHSiO)_eSiMe_3$$

wherein e has the value of from 30 to 70.

10. A coated substrate according to claim 9 wherein the ratio of silicon-bonded hydrogen atoms to silicon-bonded alkenyl radicals has a value of from 1/1 to 4/1.

11. A coated substrate according to claim 10 wherein the fluorinated siloxane units have the formula $$(CF_3CF_2CF_2CF_2CH_2CH_2)(CH_3)SiO_{2/2}$$

and all A radicals are vinyl.

* * * * *